(12) United States Patent
Sommariva et al.

(10) Patent No.: US 7,224,573 B2
(45) Date of Patent: May 29, 2007

(54) CAPACITOR HAVING A DIELECTRIC CERAMIC LAYER

(75) Inventors: Helmut Sommariva, Graz (AT); Christian Hoffmann, Deutschlandsberg (AT); Matiaz Valant, Ljubljana (SI); Danilo Suvorov, Ljubljana (SI)

(73) Assignee: EPCOS AG, Munich (DE)

( * ) Notice: Subject to any disclaimer, the term of this patent is extended or adjusted under 35 U.S.C. 154(b) by 64 days.

(21) Appl. No.: 10/363,221

(22) PCT Filed: Aug. 3, 2001

(86) PCT No.: PCT/DE01/02971

§ 371 (c)(1),
(2), (4) Date: Sep. 7, 2005

(87) PCT Pub. No.: WO02/19355

PCT Pub. Date: Mar. 7, 2002

(65) Prior Publication Data

US 2006/0034034 A1   Feb. 16, 2006

(30) Foreign Application Priority Data

Aug. 29, 2000   (DE) ............................... 100 42 359

(51) Int. Cl.
*H01G 4/06* (2006.01)
(52) U.S. Cl. .................. 361/311; 361/321.2; 501/138
(58) Field of Classification Search ........ 361/311–313, 361/321.2, 321.3, 321.4, 321.5, 322, 303; 501/134–139
See application file for complete search history.

(56) References Cited

U.S. PATENT DOCUMENTS

| 4,283,752 A | | 8/1981 | Layton |
| 5,434,742 A | * | 7/1995 | Saito et al. ............... 361/321.5 |
| 5,619,051 A | * | 4/1997 | Endo ........................ 257/316 |
| 2003/0179617 A1 | * | 9/2003 | Gudesen et al. ............ 365/200 |

FOREIGN PATENT DOCUMENTS

| DE | 36 88 098 T2 | 7/1993 |
| DE | 38 89 614 T2 | 12/1994 |
| DE | 690 22 535 T2 | 3/1996 |
| DE | 196 53 792 A1 | 6/1998 |

(Continued)

OTHER PUBLICATIONS

M. Valant, D. Suvorov, "Microwave Ceramics with Permittivity over 400"; The 9th International Meeting on Ferroelectricity, Seuol, South Korea, 1997, Absract Book, P-05-TH-067.

(Continued)

*Primary Examiner*—Eric W. Thomas
(74) *Attorney, Agent, or Firm*—Fish & Richardson P.C.

(57) ABSTRACT

A capacitor includes at least two pairs of opposing electrode layers and an intermediate dielectric layer. The intermediate dielectric layer includes a ceramic material that contains at least two different components existing in separate phases. The at least two different components have a perovskite structure that contains silver in A-positions and niobium and tantalum in B-positions. A composition of a first component and a composition of a second component are such that temperature coefficients of respective permittivities $Tk\epsilon_A$ and $Tk\epsilon_B$ have different signs within a temperature range.

11 Claims, 4 Drawing Sheets

FOREIGN PATENT DOCUMENTS

| | | |
|---|---|---|
| GB | 19722618 A1 | 3/1998 |
| JP | 2000044339 | 2/2000 |
| WO | WO 98/03446 | 1/1998 |

OTHER PUBLICATIONS

M. Valant, D. Suvorov, "New High-Permittivity Ag (Nb1-xTax)O3 Microwave Ceramics: Part 1, Crystal Structures and Phase-Decomposition Relations"; Journal of the American Ceramic Society, 82 [1], pp. 81-87 (1999).

M. Valant, D. Suvorov, "New High-Permittivity Ag (Nb1-xTax)O3 Microwave Ceramics: Part 2, Dielectric Characteristics"; Journal of the American Ceramic Society, 82 [1], pp. 88-93 (1999).

A. Kania, "Ag(Nb1-xTax)O3 Solid Solutions-Dielectric Properties and Phase Transitions" Phase Transitions, 1983, vol. 3, pp. 131 bis 140.

Moulsen, A. J. et al, "Electroceramics", Chapman and Hall, 1990.

English-Language Translation of IPER in PCT/DE01/02971 (Aug. 6, 2002).

* cited by examiner

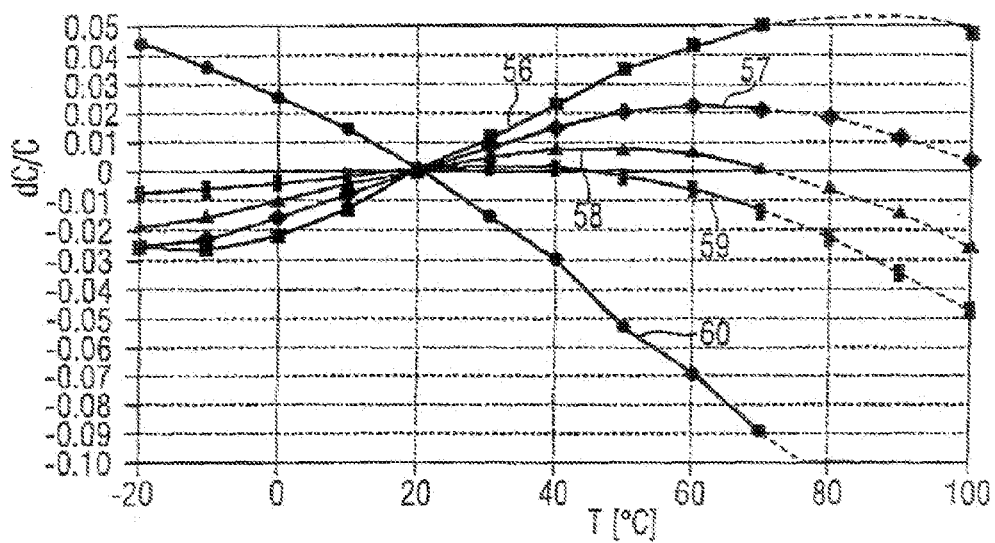
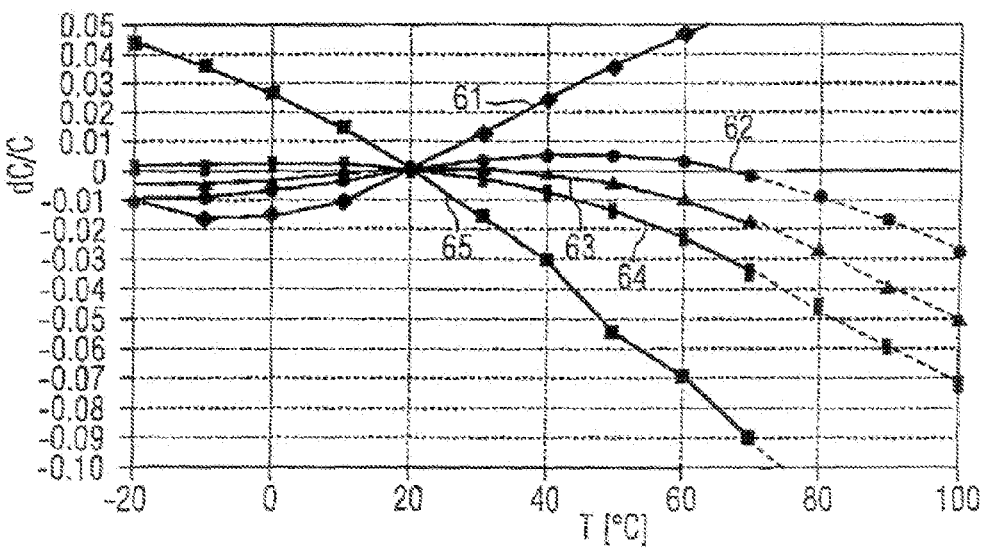

CAPACITOR HAVING A DIELECTRIC CERAMIC LAYER

CROSS-REFERENCE TO RELATED APPLICATIONS

This application claims priority to PCT Application No. PCT/DE01/02971, filed on Aug. 3, 2001, and to German Patent Application No. 100 42 359.0, filed on Aug. 29, 2000.

FIELD OF THE INVENTION

The invention relates to a capacitor with two or more opposing pairs of electrode with an intermediate dielectric layer, the dielectric layers of which comprise a ceramic material.

BACKGROUND

The publication by M. Valant and D. Suvorov, "Microwave Ceramics with Permittivity over 400," The 9th International Meeting on Ferroelectricity, Seoul, South Korea, 1997, Abstract Book, P-05-TH-067 discloses multilayer capacitors whose dielectric layers comprise a ceramic material based on a niobium-based perovskite-like solid solution having the general formula $A(B_{1-x}Nb_x)O_3$. It was found that ceramics of this type are characterized by a high relative permittivity $\epsilon>400$. Furthermore, at low frequencies between 100 kHz and 1 MHz, these ceramic materials have dielectric properties that make them suitable for use in multilayer capacitors.

A ceramic material is known from the publication by A. Kania, "$Ag(Nb_{1-x}Ta_x)O_3$ Solid Solutions—Dielectric Properties and Phase Transitions," Phase Transitions, 1983, Volume 3, pp. 131–140, produced from silver, niobium and tantalum, referred to here as ANT, which exists in the form of a solid solution of the two materials $AgNbO_3$ and $AgTaO_3$. The ceramic described in this publication comprises the composition $Ag(Nb_{1-x}Ta_x)O_3$, referred to here as ANTx, wherein x can vary from 0 to 0.7. Depending on the composition, at a temperature of approximately 300 K, the ceramic has an $\epsilon$ of between 800 and 400.

From the publication by Matjaz Valant and Danilo Suvorov, "New High Permittivity $Ag(Nb_{1-x}Ta_x)O_3$ Microwave Ceramics: Part 2, Dielectric Characteristics," J. Am. Ceram. Soc. 82 (1), pp. 88–93 (1999), it is known that disk-shaped ceramic bodies made of ANTx with an x parameter between 0.46 and 0.54, exhibit a strong relative change in the relative permittivity $\epsilon$ in the temperature range between $-20°$ C. and $120°$ C. It was demonstrated in particular that the relative change of $\epsilon$ with varying temperature describes a curve that reaches a maximum between $20°$ C. and $70°$ C., and assumes values between $-0.07$ and $0.01$.

It is further known from publication WO 98/03446 that by adding lithium, wolfram, manganese or bismuth to ANT, in the case of individual temperatures, the temperature coefficient of the relative permittivity $TK\epsilon$ can be reduced to very small values as low as $\pm-70$ ppm/K.

Although the known ANT materials have a high $\epsilon$, they have the disadvantage of having relatively high $TK\epsilon$ values in the temperature range between $-20°$ C. and $80°$ C. that is of interest for applications. At the same time, a high temperature coefficient of relative permittivity $\epsilon$ results in a high temperature coefficient of the capacitor's capacitance.

SUMMARY

Therefore, the object of the present invention is to provide a capacitor whose dielectric has a low temperature coefficient of relative permittivity.

According to the invention, this object is achieved by a capacitor according to claim 1. Advantageous embodiments of the invention can be found in the other claims.

The invention is directed to a capacitor with two or more opposing pairs of electrode layers and an intermediate dielectric layer. The dielectric layers comprise a ceramic material containing at least two different components that exist in separate phases. Each of the components has a perovskite structure that contains silver in the A-positions and niobium and tantalum in the B-positions. The composition of one of the components (component A) and the composition of an additional component (component B) are selected in such a way that the temperature coefficients of their respective permittivities $Tk\epsilon_A$ and $TK\epsilon_B$ have different signs in a temperature range.

The ANT material has the advantage of having a high $\epsilon>300$. In addition, the ceramic material according to the invention has the advantage of having low dielectric loss. By mixing two components, each of which has a $Tk\epsilon$ with a different sign, temperature dependency of the relative permittivity can be largely compensated so that the ceramic material according to the invention has a smaller $Tk\epsilon$ than its components. Compensation can be achieved not only partially at fixed temperatures, but also throughout the entire temperature range, within which the individual components have different signs. That is, compensation is not limited to individual points on the temperature scale.

Because the components in the ceramic material according to the invention exist as separate phases, in the event that the ceramic material includes only two different components, the $Tk\epsilon$ of the ceramic material can be given by the following Lichtenecker rule formula:

$$Tk\epsilon = V \times Tk\epsilon_A + (1-V) \times Tk\epsilon_B$$

In the above formula, V stands for the volume share of component A in the total volume of the components and $Tk\epsilon_A$ and $Tk\epsilon_B$ indicate the temperature coefficients of corresponding components A and B.

According to the Lichtenecker rule, suitable selection of the volume share of the component A for a given temperature can result in complete compensation of the temperature coefficients of the corresponding permittivity. This Lichtenecker rule is now used to determine an optimum volume share of component A in the total volume of components A and B, in such a way that optimum compensation of the temperature coefficients can be achieved in the temperature range within which the individual components have different signs.

To this end, according to the invention, the volume share of component A in the total volume of components A and B is selected in such a way that it deviates less than 25% from the volume share V, which is calculated using the following formula:

$$V \times S_A + (1-V) \times S_B = 0$$

In this formula, $S_A$ and $S_B$ correspond to the slopes of straight lines that best approximate the respective temperature-dependent curves showing relative changes in the relative permittivities of component A and/or component B in a given temperature range.

By applying the Lichtenecker rule for individual temperatures to a temperature range, it is possible to achieve an optimum compensation of temperature coefficients $Tk\epsilon$ with different signs. Using the arithmetic rule specified above, the mean of the temperature coefficients $Tk\epsilon$, weighted with the volume share, is used to calculate suitable volume shares.

Because the Lichtenecker rule used for calculation adds the $Tk\epsilon$ values in a linear fashion, the compensation of temperature coefficients $Tk\epsilon$ operates more efficiently the more closely the temperature-dependent curve of the relative change in the relative permittivity of the individual components approximates a straight line. It is therefore desirable to come as close to this linear curve as possible using a suitable composition of the components.

Such an approximation to linear behavior can be achieved in an especially advantageous way by selecting one of the components with a suitable quantitative ratio of niobium to tantalum.

In order for the compensation of opposite temperature curves to work, the components A and B must exist in separate phases.

Tests have shown that a first possibility of realizing separate phases comprises mixing the components A and B as not overly small particles with a particle size of >5 μm. In case smaller particle sizes are used, an exchange of material occurs between the components due to diffusion. This results in a solid solution representing a new material with new properties. Here, a simple "linear superposition" of the components A and B, as described by the Lichtenecker rule, is no longer possible. The use of particle sizes >5 μm has the effect of the particles mixing only at the periphery due to the slow diffusion processes, resulting in essentially separate phases for component A and component B.

An additional possibility for maintaining the two components A and B in separate phases comprises arranging components A and B in different dielectric layers separated by electrode layers. These electrode layers can, for example, be metallic layers, in particular silver/palladium electrode layers, which effectively block an exchange of material between components A and B during sintering because they represent a diffusion barrier. It is therefore necessary to produce dielectric layers that contain only component B of the ceramic material.

Separating the individual phases using intermediate electrode layers also makes it possible to arrange components A and B of the ceramic material in the form of particles smaller than those described above in the capacitor. Due to the blocked diffusion between component A and component B, particle size ceases to be crucial and components A and B can then, for example, exist in the form of grains between 100 nm and 5 μm in dimension, such as are easily produced by grinding in a standard method for manufacturing ceramics.

The existence of different components in the form of small grains also makes it possible to produce dielectric layers of the capacitor with a very small thickness between 1 and 50 μm. As a result, at the same volume, a significantly larger number of dielectric layers can be inserted as well as more sub-capacitors. Such thin dielectric layers between 1 and 50 μm are not possible when using components in the form of large particles, since a single layer of particles would exceed the allowed thickness of the dielectric layer.

Furthermore, a capacitor is especially advantageous in which the superimposed dielectric layers are created by stacking each metalized ceramic green compact of component A and each metalized green compact of component B, followed by sintering the foil stack. The metallization of the green compact forms the electrode layers. To a great extent, such a capacitor permits use of known methods for manufacturing multilayer capacitors. The order in which the green compacts of component A and/or the green compacts of component B are superimposed is also insignificant due to the fact that the capacitor normally comprises a number of individual sub-capacitors connected in series and/or in parallel. In any case, compensation of the temperature coefficients of the relative permittivities of the individual dielectric layers is guaranteed.

It is particularly advantageous for the capacitor to contain a ceramic material produced with boric acid as a sintering aid. Boric acid has the advantage of not lowering the insulation resistance of the ANT ceramic in a disadvantageous manner.

The following describes the invention in greater detail on the basis of exemplary embodiments and accompanying figures.

DESCRIPTION OF THE DRAWING

FIGS. 2 through 8 show curves of different ANT materials that can be used as component A or component B for the capacitor according to the invention.

FIGS. 3, 4, 5, 6, 7 and 8 additionally show curves of mixtures of component A with component B.

DETAILED DESCRIPTION

In the figures, the relative change in capacitance $\Delta C/C$ of the layer sample is shown as a function of temperature. The change in capacitance is directly linked with the value $\Delta\epsilon/\epsilon$ via $C=\epsilon \times A/d$.

Figure 1:
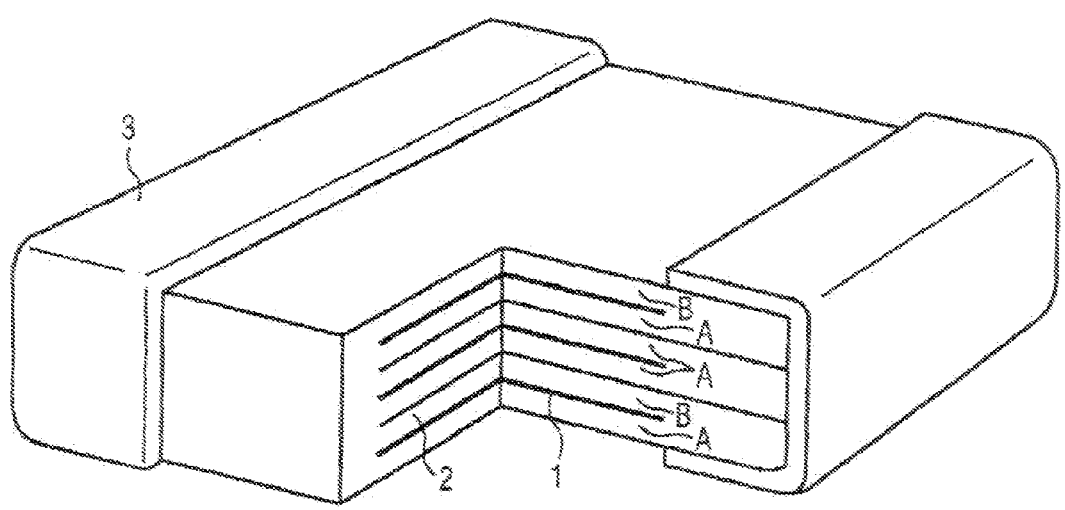
FIG. 1 shows an example of a capacitor according to the invention in a schematic sectional view.

FIG. 1 shows a capacitor according to the invention with electrode layers 1, which can be silver/palladium electrodes, for example. These electrode layers 1 are separated by dielectric layers 2. Two types of dielectric layers 2, which are electrically connected via a contact layer 3, intersect in a comb-like fashion, thereby creating a parallel circuit of semi-capacitances. The contact layers 3 are silver burnt-in electrodes.

The dielectric layers 2 comprise, as indicated by letters A and B in FIG. 1, either a ceramic material of component A or a ceramic material of component B. According to the exemplary embodiment in FIG. 1, four dielectric layers 2 from component A and two dielectric layers 2 from component B are arranged in the capacitor. Accordingly, the volume ratio of component A to component B in this capacitor is 4:2. By increasing the total number of dielectric layers 2 and by selecting different numbers of dielectric layers for component A or component B, it is possible to produce random mixing ratios between component A and component B.

In the following, various ceramic materials suitable for component A and component B are presented with their electrical properties. Please note that in each of the following examples, a mixing of the components is possible either in the form of mixed particles or in the form of superimposed dielectric layers separated by electrode layers assigned to a component A or a component B. In the samples described below, 1 and 1.5 percent by weight $H_3BO_3$ was added to the ceramic material at 950° C. before final calcination. The ceramic was then sintered for five hours at 1070° C. Thereafter, the dielectric properties of the materials produced in this fashion were tested at frequencies of 1 MHz and approximately 2 GHz.

The component B known from the compositions described above (ANTx with x=0.65) was used as component B for the composite ceramic. The components were mixed as a particle with a medium grain size of 30.9 μm (component A) and 27.7 μm (component B) and then sintered together.

Figure 2:
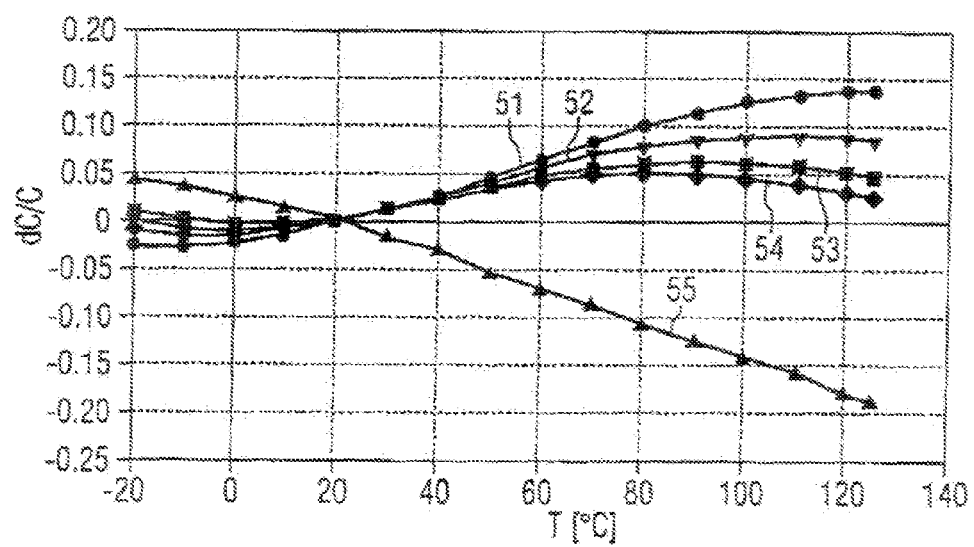

In a first series of tests, a component B with 1 percent by weight $H_3BO_3$ and a number of possible components A with different excesses of niobium and/or tantalum were tested. The results are shown in FIG. 2. Curves 51 through 54 refer to a component A with varying x content and curve 55 refers to the component B specified above, with x=0.65. Curve 51 describes the composition of component B with x=0.35, curve 52 with x=0.38, curve 53 with x=0.40 and curve 54 with x=0.42.

FIG. 2 shows that, in particular, the composition according to curve 51 exhibits good linearity, which is especially well suited for use as component A in the capacitor according to the invention.

Ceramic materials with different mixture ratios of component A to component B were produced with the different components A shown in FIG. 2, as shown by Table 1 below. Column 1 of Table 1 shows the excess of niobium of component A used as an x value. Column 2 contains the weight-specific ratio of component A to component B.

Columns 3, 4, 5, 6 and 7 show dielectric core values for the shrinkage S of the samples. The last column of Table 1 provides the optimum mixture of component A and component B of each maximum change of the relative permittivity in the temperature range from −20° C. and 120° C. for the respective curve.

TABLE 1

Relative permittivity and dielectric losses of a composite ceramic with 1 percent by weight $H_3BO_3$ as a sintering aid, sintered at 1070° C. for five hours (component B = ANTx with x = 0.65)

| | | 1 MHz | | 2 GHz | | S | Δε/ε max |
|---|---|---|---|---|---|---|---|
| x | A/B | ε | tanδ | $ε^1$ | Qxf [GHz] | [%] | [%] |
| 0.42 | 60/40 | 386 | 0.0007 | 371 | 597 | 10.1 | 1.8 |
| | 62.5/37.5 | 390 | 0.0002 | 398 | 566 | 9.7 | |
| | 70/30 | 408 | 0.0004 | 408 | 492 | 10.9 | |
| 0.40 | 40/60 | 328 | 0.0007 | 326 | 664 | 9.3 | |
| | 50/50 | 370 | 0.0004 | 385 | 577 | 9.6 | |
| | 60/40 | 385 | 0.0004 | 395 | 493 | 9.8 | 1.5 |
| 0.38 | 35/65 | 339 | 0.0010 | 355 | 654 | 10.2 | |
| | 45/55 | 347 | 0.0005 | 357 | 592 | 9.8 | |
| | 55/45 | 375 | 0.0005 | 403 | 516 | 10.1 | 1.2 |
| 0.35 | 30/70 | 317 | 0.0005 | 323 | 644 | 9.0 | |
| | 40/60 | 350 | 0.0009 | 363 | 560 | 10.0 | |
| | 45/55 | 341 | 0.0002 | 362 | 539 | 9.1 | 0.8 |
| | 50/55 | 354 | 0.0005 | 375 | 479 | 9.7 | |

Table 1 shows that at least the composite ceramics produced with the optimum mixing ratio of component A to component B with various x values of component A are suitable for multilayer capacitors.

FIG. 3 shows curves for different composite ceramics with a component A where x=0.42 (8% niobium excess) and with different mixing ratios of component A to component B. Curve 56 shows the 60/40 mixing ratio, curve 57 the 70/30 mixing ratio, curve 58 the 62.5/37.5 mixing ratio, curve 59 the curve for pure component A, and curve 60 the curve for pure component B.

FIG. 4 shows curves for different composite ceramics with a component A where x=0.40 (10% niobium excess) and with different mixing ratios of component A to component B. Curve 62 shows the 60/40 mixing ratio, curve 64 the 40/60 mixing ratio, curve 63 the 50/50 mixing ratio, curve 61 the curve for pure component A, and curve 65 the curve for pure component B.

Figure 5:
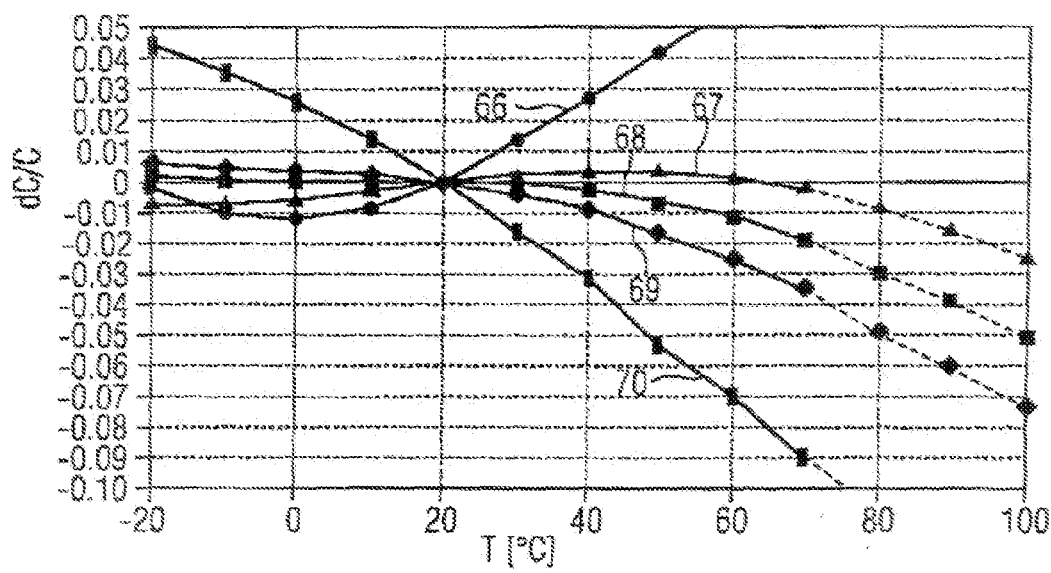

FIG. 5 shows curves for different composite ceramics with a component A where x=0.38 (12% niobium excess) and with different mixing ratios of component A to component B. Curve 69 shows the 35/65 mixing ratio, curve 68 the 45/55 mixing ratio, curve 67 the 55/45 mixing ratio, curve 70 the curve for pure component A, and curve 66 the curve for pure component B.

Figure 6:
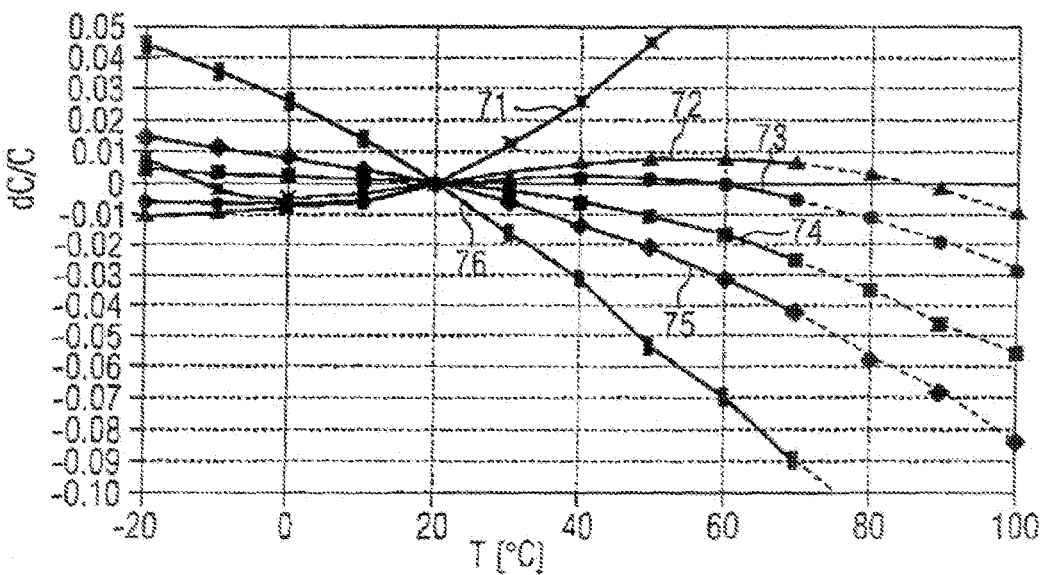

FIG. 6 shows curves for different composite ceramics with a component A where x=0.35 (15% niobium excess) and with different mixing ratios of component A to component B. Curve 75 shows the 30/70 mixing ratio, curve 73 the 40/60 mixing ratio, curve 72 the 50/50 mixing ratio, curve 71 shows the 45/55 mixing ratio, curve 76 the curve for pure component A, and curve 71 the curve for pure component B.

Additional tests examined the effects of increasing the boric acid share from 1 percent by weight to 1.5 percent by weight. It was found that the increased boric acid share facilitated sintering of the ANT powder. It also obtained slightly higher values for the relative permittivity. The dielectric losses, measured at 1 MHz, show no significant change with the $H_3BO_3$ concentration, while the Qxf values at 2 GHz are a bit less favorable than with the addition of 1 percent by weight $H_3BO_3$.

Figure 7:
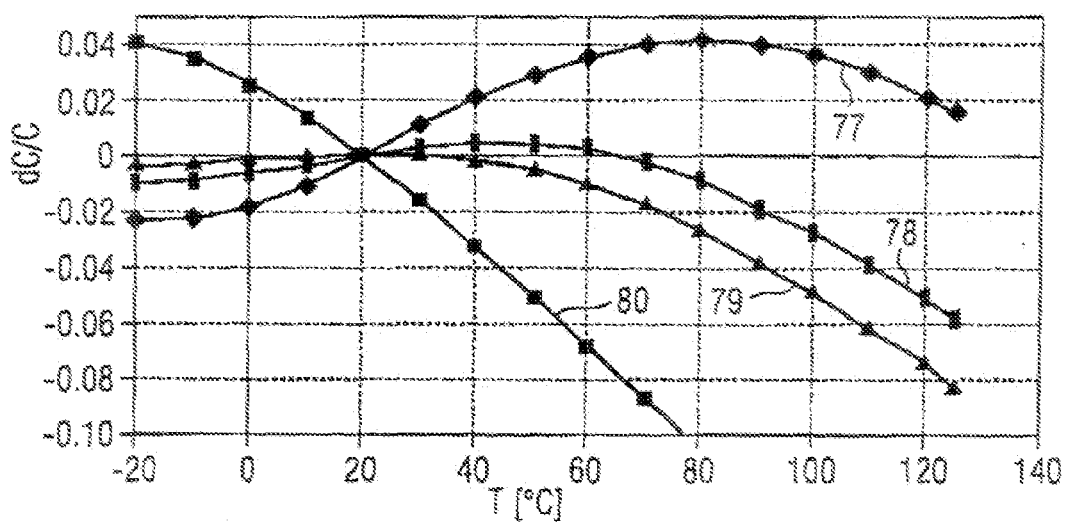

FIG. 7 shows the curves for an ANTx system produced by adding 1.5 percent by weight $H_3BO_3$. The other production parameters were the same as in the samples with 1 percent by weight $H_3BO_3$. Curve 77 shows the curve for a component A with x=0.42, curve 78 the curve for a mixture of component A and component B with a weight-specific ratio of 70/30, curve 79 a composite ceramic with a 50/50 mixing ratio and, finally, curve 80 the curve for pure component B with x=0.65.

Figure 8:
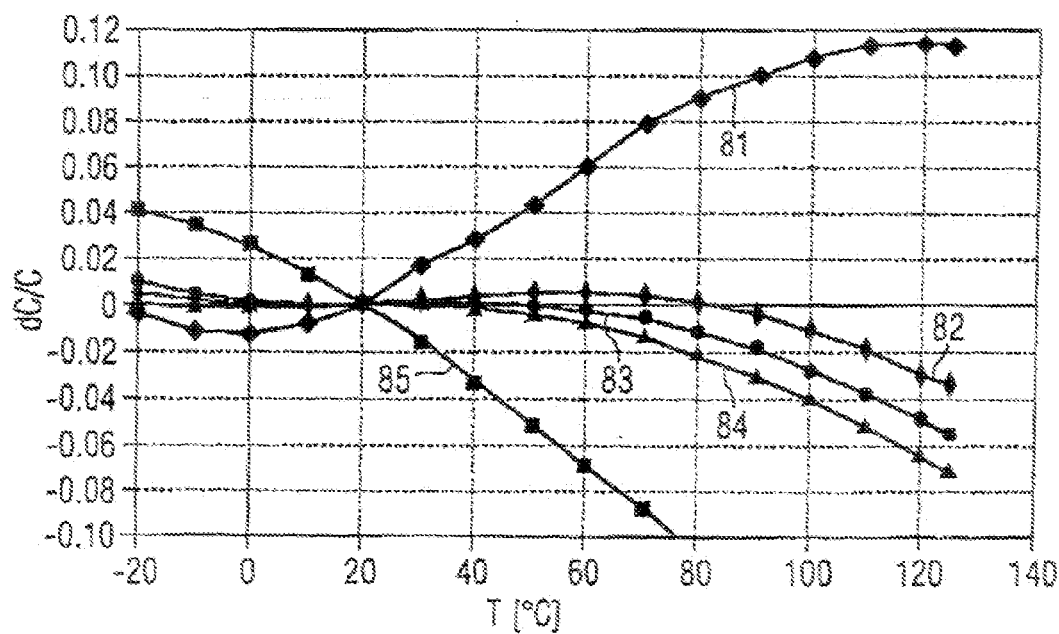

FIG. 8 shows temperature curves for a composite ceramic according to the invention (1.5 percent by weight $H_3BO_3$) with a component A with x=0.35 (15% niobium excess) and with various mixing ratios of component A to component B. Curve 81 shows the component A with x=0.35, curve 82 shows a mixture with a 60/40 mixing ratio, curve 83 with a 55/45 mixing ratio, curve 84 with a 45/55 mixing ratio, and curve 85 the component B with x=0.65.

Table 2 below shows, as in Table 1, the dielectric properties and the shrinkage for the component B mixtures with a niobium excess of 8% (x=0.42) and with a niobium excess of 15% (x=0.65). For each optimum mixing ratio of component A to component B, the maximum relative change in relative permittivity within the temperature range between −20° C. and 120° C. is given in percent.

TABLE 2

Relative permittivity and dielectric losses of a composite ceramic with 1.5 percent by weight $H_3BO_3$ as a sintering aid, sintered at 1070° C. for five hours (component B = ANTx with x = 0.65)

| | | 1 MHz | | 2 GHz | | S | Δε/ε max |
|---|---|---|---|---|---|---|---|
| x | A/B | ε | tanδ | $ε^1$ | Qxf [GHz] | [%] | [%] |
| 0.42 | 60/40 | 398 | 0.0003 | 395 | 545 | 11.5 | |
| | 70/30 | 408 | 0.0004 | 408 | 492 | 10.9 | 1.4 |

TABLE 2-continued

Relative permittivity and dielectric losses of a composite
ceramic with 1.5 percent by weight $H_3BO_3$ as a sintering aid,
sintered at 1070° C. for five hours
(component B = ANTx with x = 0.65)

|  |  | 1 MHz |  | 2 GHz |  | S | Δε/ε max |
|---|---|---|---|---|---|---|---|
| x | A/B | ε | tanδ | $\epsilon^1$ | Qxf [GHz] | [%] | [%] |
| 0.35 | 60/40 | 414 | 0.0004 | 436 | 360 | 11.7 | 0.6 |
|  | 55/45 | 397 | 0.0004 | 435 | 419 | 11.2 |  |
|  | 45/55 | 341 | 0.0002 | 362 | 539 | 10.7 |  |

In the following, capacitors with special ceramic materials are specified, for which the electrical characteristics of the capacitors were measured.

For composition A, a calcinated precursor was used consisting of 45.4 percent by weight $Nb_2O_5$ and 54.6 percent by weight $Ta_2O_5$. After this, 58.9 percent by weight calcinate was mixed with 40.1 percent by weight silver oxide and 1 percent by weight $H_3BO_3$, and calcinated again. $H_3BO_3$ was used as a sintering aid. Additional processing of this mixture up to type A green compact was performed using known methods.

A second precursor was produced to create composition B. This precursor comprises a mixture of 24.5 percent by weight $Nb_2O_5$ and 75.5 percent by weight $Ta_2O_5$. The other process steps up to the first calcination correspond to those used to create composition B. Subsequently, 61.5 percent by weight of the calcinate was mixed with 37.5 percent by weight $Ag_2O$ and 1 percent by weight $H_3BO_3$ and calcinated again. This mixture was then further processed as indicated for type A green compacts.

Two capacitors were produced; in both cases green compact was stacked, pressed together and then sintered with the metal coating found on the green compacts. A capacitor 1 was produced with ten dielectric layers of type A, each having a thickness of 20 μm and a surface of 10 $mm^2$. In addition, a capacitor 2 according to the invention was produced with five dielectric layers of type A and five dielectric layers of type B, each with the geometric measurements specified for capacitor 1.

Table 3 below shows the electrical characteristics of capacitors 1 and 2. TKC refers to a temperature range between −20° C. and 120° C.

TABLE 3

Electrical properties of exemplary multilayer capacitors

| Capacitor | C [nF] | tanδ | TKC |
|---|---|---|---|
| 1 | 2.7 | $0.4 \times 10^{-3}$ | −3 . . . 6.3% |
| 2 | 2.4 | $0.43 \times 10^{-3}$ | −3 . . . 1% |

Table 3 shows that the capacitor 2 according to the invention, which comprises both type A and type B dielectric layers, has a significantly smaller TKC than the capacitor 1 with only one type of dielectric layers.

The invention is not limited to the exemplary embodiments shown; rather, it is defined in its most general form in claim 1.

The invention claimed is:

1. A capacitor comprising:
   at least two pairs of opposing electrode layers; and
   an intermediate dielectric layer;
   wherein the intermediate dielectric layer comprises a ceramic material that contains at least two different components existing in separate phases, the at least two different components have a perovskite structure that contains silver in A-positions and niobium and tantalum in B-positions, and a composition of a first component and a composition of a second component are such that temperature coefficients of respective permittivities $Tk\epsilon_A$ and $Tk\epsilon_B$ have different signs within a temperature range.

2. The capacitor according to claim 1, wherein a volume share of the first component in a total volume of the first and second components deviates less than 25% from a volume share which is calculated using the following formula:

$$V \times S_A + (1-V) \times S_B = 0,$$

wherein $S_A$ and $S_B$ represent slopes of straight lines that approximate respective temperature-dependent curves corresponding to a relative change in permittivities of the first and second components in the temperature range.

3. The capacitor according to claim 1, wherein the first and second components have a composition of $Ag(Nb_{1-x}Ta_x)O_3$, and wherein for the first component $0.50 < 1-x \leq 0.70$ and for the second component $0.30 < 1-x \leq 0.50$.

4. The capacitor according to claim 3, wherein for the first component $0.64 < 1-x \leq 0.66$ and for the second component $0.34 \leq 1-x \leq 0.36$, and wherein a volume-related mixing ratio of first/second components in the ceramic material is between 40/60 and 50/50.

5. The capacitor according to claim 4, wherein the first and second components comprise particles with a dimension of between 5 μm and 500 μm.

6. The capacitor according to claim 1, wherein a mixture of particles for the first component with particles for the second component in the ceramic material is created by sintering.

7. The capacitor according to claim 1, wherein the first and second components are in different dielectric layers, which are separated by intermediate electrode layers.

8. The capacitor according to claim 1, wherein the first and second components comprise particles with a dimension of between 100 nm and 5 μm.

9. The capacitor according to claim 1, wherein the intermediate dielectric layers have a thickness between 1 nm and 50 μm.

10. The capacitor according to claim 1, wherein the intermediate dielectric layer comprises stacked metalized ceramic green compacts of the first component and of the second component.

11. The capacitor according to claim 1, wherein the ceramic material contains boric acid.

* * * * *